（12) United States Patent
Kittmann et al.

(10) Patent No.: US 10,871,546 B2
(45) Date of Patent: Dec. 22, 2020

(54) SYSTEM AND METHOD FOR CALIBRATING A TRANSMITTING UNIT, AND WATERCRAFT COMPRISING A SYSTEM FOR CALIBRATING A TRANSMITTING UNIT

(71) Applicant: Airbus Defence and Space GmbH, Taufkirchen (DE)

(72) Inventors: Klaus Kittmann, Kirchseeon (DE); Simon Burns, Munich (DE)

(73) Assignee: Airbus Defence and Space GmbH

( * ) Notice: Subject to any disclaimer, the term of this patent is extended or adjusted under 35 U.S.C. 154(b) by 228 days.

(21) Appl. No.: 16/047,252

(22) Filed: Jul. 27, 2018

(65) Prior Publication Data

US 2019/0064314 A1 Feb. 28, 2019

(30) Foreign Application Priority Data

Aug. 2, 2017 (DE) .......................... 10 2017 117 498

(51) Int. Cl.
*G01S 5/02* (2010.01)
*G01S 13/91* (2006.01)
(Continued)

(52) U.S. Cl.
CPC ............ *G01S 5/0284* (2013.01); *G01S 1/022* (2013.01); *G01S 5/021* (2013.01); *G01S 7/40* (2013.01);
(Continued)

(58) Field of Classification Search
CPC . G01S 5/021; G01S 5/06; G01S 1/026; G01S 5/02; G01S 5/0252; G01S 5/0221; G01S 5/0284; G01S 5/0045; G01S 11/02; G01S 19/51; G01S 7/40; G01S 13/913; G01S 1/022; G01S 13/74; G01S 13/876; G01S 7/4008; H04W 64/00
See application file for complete search history.

(56) References Cited

U.S. PATENT DOCUMENTS

| 4,799,062 | A | 1/1989 | Sanderford, Jr. et al. |
| 5,144,315 | A | 9/1992 | Schwab et al. |

(Continued)

FOREIGN PATENT DOCUMENTS

DE  602 22 606 T2  7/2008

*Primary Examiner* — Olumide Ajibade Akonai
(74) *Attorney, Agent, or Firm* — Lerner, David, Littenberg, Krumholz & Mentlik, LLP (57) ABSTRACT

A system for calibrating a transmitting unit includes an arrangement of at least four transmitting units. A first transmitting unit has stored position data with respect to a setpoint position of the first transmitting unit. The first transmitting unit is designed to emit a first transmission signal to each of the three remaining transmitting units, each of which is designed to receive the first transmission signal and, thereafter, to return a first response signal to the first transmitting unit. The first transmitting unit is designed to determine its relative position data with respect to the three remaining transmitting units on the basis of the first response signals returned and to detect a deviation between the stored position data and the relative position data determined and to carry out a calibration of a transmission parameter of the first transmitting unit on the basis of the detected deviation.

13 Claims, 2 Drawing Sheets

(51) Int. Cl.
  *G01S 7/40*   (2006.01)
  *G01S 1/02*   (2010.01)
  *G01S 13/74*  (2006.01)
  *G01S 13/87*  (2006.01)
(52) U.S. Cl.
  CPC ............ *G01S 13/913* (2013.01); *G01S 13/74* (2013.01); *G01S 13/876* (2013.01)

(56) References Cited

U.S. PATENT DOCUMENTS

| | | | |
|---|---|---|---|
| 5,365,516 A | 11/1994 | Jandrell | |
| 6,114,975 A | 9/2000 | Guillard | |
| 6,469,654 B1 | 10/2002 | Winner et al. | |
| 6,876,326 B2 | 4/2005 | Martorana | |
| 7,411,551 B2 | 8/2008 | Choi et al. | |
| 8,531,290 B2 | 9/2013 | Ghisani | |
| 9,423,489 B2 | 8/2016 | Oehler et al. | |
| 9,606,219 B2 | 3/2017 | Murdock et al. | |
| 2001/0053699 A1 | 12/2001 | McCrady et al. | |
| 2002/0155845 A1* | 10/2002 | Martorana | G01S 5/14 455/456.1 |
| 2003/0142587 A1 | 7/2003 | Zeitzew | |
| 2004/0022214 A1* | 2/2004 | Goren | G01S 5/0252 370/332 |
| 2004/0220722 A1 | 11/2004 | Taylor | |
| 2005/0046608 A1 | 3/2005 | Schantz et al. | |
| 2006/0071780 A1 | 4/2006 | McFarland | |
| 2007/0217379 A1 | 9/2007 | Fujiwara et al. | |
| 2007/0257831 A1 | 11/2007 | Mathews et al. | |
| 2008/0231498 A1 | 9/2008 | Menzer et al. | |
| 2009/0143018 A1 | 6/2009 | Anderson et al. | |
| 2011/0081918 A1* | 4/2011 | Burdo | H04L 67/306 455/456.1 |
| 2011/0221635 A1 | 9/2011 | Wang | |
| 2012/0326923 A1 | 12/2012 | Oehler et al. | |
| 2013/0306800 A1 | 11/2013 | Meissner et al. | |
| 2014/0073351 A1* | 3/2014 | Loetter | G01S 5/0221 455/456.1 |
| 2014/0247184 A1 | 9/2014 | Wendel | |
| 2016/0363659 A1 | 12/2016 | Mindell et al. | |
| 2017/0168134 A1 | 6/2017 | Jenwatanavet | |
| 2017/0280288 A1* | 9/2017 | Do | G01S 5/021 |
| 2017/0328683 A1 | 11/2017 | Smith | |
| 2018/0203466 A1 | 7/2018 | Chiodini et al. | |

* cited by examiner

SYSTEM AND METHOD FOR CALIBRATING A TRANSMITTING UNIT, AND WATERCRAFT COMPRISING A SYSTEM FOR CALIBRATING A TRANSMITTING UNIT

FIELD OF THE INVENTION

The present invention relates to the calibration of transmitting and receiving units for radio waves. In particular, the invention relates to a system for calibrating a transmitting unit. Furthermore, the invention relates to a watercraft comprising a system for calibrating a transmitting unit, and to a method for calibrating a transmitting unit.

BACKGROUND OF THE INVENTION

Radio signals are often used nowadays for position determination. In this case, such radio signals are transmitted, as a response to a radio signal coming from the object, by various transmitting units or radio beacons to the object to be navigated, whereupon the position thereof can be determined. Occasionally it may happen that individual radio beacons have to be exchanged, for example owing to a malfunction or failure of a transmitting unit. As a general rule this is carried out manually by the service personnel in the context of maintenance and repair work, which firstly may be protracted and secondly leads to high maintenance costs. While the radio beacon is being exchanged by the service personnel, the radio beacon is not usable, which can also adversely affect in particular the reliability of the navigation system. Moreover, the maintenance work has to be carried out by the personnel often under adverse use conditions, in particular under poor weather conditions.

BRIEF SUMMARY OF THE INVENTION

An aspect of the present invention may improve or simplify the calibration of transmitting units within an arrangement of transmitting units.

In accordance with one aspect of the invention, a system for calibrating a transmitting unit is specified. The system comprises an arrangement of at least four transmitting units. The arrangement can be provided in an installation environment which is stationary or is situated on a moving platform. The first transmitting unit of the at least four transmitting units has stored position data with respect to a setpoint position of the first transmitting unit. The position data with respect to the setpoint positions can be stored in a memory unit of the first transmitting unit and represent a desired spatial position of the first transmitting unit. The first transmitting unit is designed to emit a first transmission signal to each of the three remaining transmitting units. Each of the three remaining transmitting units is in turn designed to receive the first transmission signal and, after receiving the first transmission signal, to return a first response signal to the first transmitting unit. The first transmitting unit is designed to determine relative position data, in particular spatial position information of the first transmitting unit with respect to the three remaining transmitting units on the basis of the first response signals returned and/or the first transmission signal. The relative position data can represent an actual position of the first transmitting unit within the arrangement. The first transmitting unit is designed to detect a for example geometric deviation between the stored position data with respect to a setpoint position of the first transmitting unit and the relative position data determined and to carry out a calibration of a transmission parameter of the first transmitting unit on the basis of the detected deviation.

A calibration within the meaning of the present invention can comprise a detection of the deviation between the stored position data and the relative position data determined and also a utilization of the detected deviation for correcting the transmission parameter. The deviation can result from a deviation in the propagation time of the signals. A correction can be necessary in order to obtain a coordinated, set arrangement of transmitting units which can subsequently be used for a navigation of an object that is moving in relation to the arrangement. Therefore, after the calibrating, the arrangement that is coordinated and set in terms of signalling can be used as a navigation system for determining the position of the moving object relative to the arrangement itself.

By means of the system for calibrating a transmitting unit according to an embodiment of the invention, it is possible to achieve a self-adaptation of transmission parameters within an arrangement of transmitting units, in particular an arrangement of radio beacon transmitting units. In other words, after a for example physical installation within the arrangement of transmitting units, the first transmitting unit can carry out an automatic adaptation of its transmission properties such as time parameters or frequency parameters. Such an installation of the first transmitting unit may become necessary, for example, if a transmitting unit within the arrangement of transmitting units has failed, such that said transmitting unit must be replaced by another transmitting unit, here the first transmitting unit. In this case, the installation can be carried out by service personnel. After the new, first transmitting unit has been installed, an actual position of the first transmitting unit may deviate from a setpoint position of the first transmitting unit. This deviation can be compensated for in an efficient manner by the system according to the invention, in particular by the calibration. During the calibration, a correction of the transmission parameter of the first transmitting unit takes place, for example, wherein the correction or the corrected transmission parameter takes account of the deviation mentioned above. A fully calibrated arrangement of transmitting units can thus be provided. In particular, the result of the calibration can be that the transmission parameters of all the transmitting units are coordinated with one another.

This makes it possible to avoid the need for a manual calibration of the first transmitting unit to be carried out by the service personnel. In particular, the exchange of a transmitting unit and the associated calibration of the transmitting unit can be carried out without the use of laser tachymeters. Rather, an independent or automatic configuration or calibration of the newly installed transmitting unit within the arrangement of transmitting units is possible. Furthermore, it is possible to avoid inaccuracies during the calibration. The system can therefore also be regarded as a system for calibrating a local navigation system.

The system for calibrating a transmitting unit may therefore prove to be particularly advantageous on watercraft or ships on which transmitting units in the form of radio beacons are used as a landing aid for aircraft. Consequently, a calibration of transmitting and receiving units for radio waves is provided by the system according to the invention. The transmitting units can thus be transmitters and receivers for radio beacons or luminous beacons. In particular, the transmitting units can be radio transmitters and radio receivers.

The at least four transmitting units can be positioned in a specific spatial arrangement with respect to one another. In this case, the transmitting units can be arranged at respectively predefined distances relative to one another. The transmitting units can be arranged for example in a specific pattern, for example a rectangle or a square. It is also possible to provide more than four transmitting units in the arrangement. The transmitting units are designed for example to emit signals, that is to say transmission signals, but also to receive emitted signals, for example response signals. In other words, the transmitting units can emit transmission signals and receive response signals, that is to say reception signals.

All the transmitting units can comprise a memory unit. The memory unit is for example a data memory for storing measurement signals, in particular propagation time measurement signals. The first transmitting unit can thus comprise a memory unit in which at least one setpoint position of the first transmitting unit is stored. A setpoint position within the meaning of the present invention is for example a desired position of a transmitting unit. The setpoint positions therefore mark for example those desired positions of the transmitting units within the arrangement at which a finished set, coordinated and usable navigation system can be provided. If the transmitting units were located exactly at their respective setpoint positions, a calibration would no longer be necessary.

Storing the setpoint position in the first transmitting unit can be carried out manually before or after the installation of the first transmitting unit in the arrangement. However, the first transmitting unit can already have the setpoint position as a preprogrammed parameter or value. That is to say that the setpoint position may already have been prestored ex works in the memory unit of the first transmitting unit, such that the first transmitting unit would need only be brought into the vicinity of the setpoint positon prestored for it and then also be fully calibrated.

The first transmitting unit thus transmits a first transmission signal to the remaining at least three transmitting units, whereupon said at least three or else more transmitting units in each case receive the first transmission signal. After receiving the first transmission signal, the at least three transmitting units each generate a first response signal in reaction to receiving the first transmission signal and return said first response signal to the first transmitting unit. On the basis of the first transmission signal transmitted and the first response signals returned, the first transmitting unit can then determine the relative position data of the first transmission signals, wherein the relative position data have information about a relative, that is to say actual, position of the first transmitting unit in relation to each of the remaining three transmitting units. That is to say that from a propagation time measurement of the first transmission signal and/or of the respective first response signal, for example, it is possible to calculate the distance of the first transmitting unit with respect to each of the three remaining transmitting units, which ultimately results in the relative position of the first transmitting unit within the overall arrangement. A distance between the transmitting units can thus be calculated from the propagation time measurements, taking into account the known propagation velocities of the signals. It is thus possible to determine the actual position of the first transmitting unit with respect to the three remaining transmitting units. Consequently, the actual, spatial position of the first transmitting unit within the arrangement of transmitting units is known.

Afterwards, the first transmitting unit can detect a deviation between the stored position data with respect to the setpoint position of the first transmitting unit and the relative position data determined and carry out a calibration of a transmission parameter of the transmitting unit on the basis of the detected deviation. That is to say that the first transmitting unit itself can ascertain the deviation, in particular a geometric distance between the setpoint position of the first transmitting unit and the determined relative position of the first transmitting unit. To that end, the first transmitting unit can comprise a control unit, in particular a data processing unit, which ascertains the deviation and thereupon carries out the calibration. All the transmitting units can be equipped with a control unit that can carry out the emission and reception of the transmission and response signals, respectively. The control unit can be a data processing system or a processor.

The calibration can furthermore take account of deviations that bring about a change in the signal transmission characteristics. These may be system-inherent properties, such as, for example, deviations which are brought about by temperature differences and which can influence the transmission response characteristic of the transmission and response signals. A temperature-dictated delay of the individual transmitting units may occur, for example, which can be compensated for by the calibration.

What is achieved by calibrating the transmission parameter of the first transmitting unit is that the first transmitting unit can be incorporated into the arrangement of transmitting units in a coordinated manner in terms of signalling, despite a possibly spatially incorrect installation. That means that the transmission parameter is calibrated in such a way that an incorrect positioning of the first transmitting unit and system-inherent discrepancies in the first transmitting unit can be taken into account. This has the consequence that a transmission signal or a response signal is emitted or respectively returned by the first transmitting unit with the required time shift or a changed frequency in order that the first transmitting unit is once again in concert with the entire arrangement of transmitting units, that is to say is coordinated with the other transmitting units of the arrangement and is thus incorporated into the arrangement in terms of signalling. In other words, the calibration can therefore compensate or make up for a deviation of the propagation time of a signal within an optimum arrangement of transmitting units with respect to the propagation time of a signal of an actual arrangement of transmitting units.

In general, a deviation based on an incorrect installation, that is to say an installation of the first transmitting unit at an incorrect position, and on a system-inherent inaccuracy can therefore be compensated for by the calibration of the transmission parameter.

The system for calibrating a transmitting unit can be applied not only to the first transmitting unit but also to any other arbitrary transmitting unit within an arrangement of transmitting units, for example in the case of a maintenance-dictated exchange of a transmitting unit of the arrangement.

After the calibration of the transmission parameter of the first transmitting unit, a set or balanced arrangement of transmitting units can be provided. This set arrangement can then be used as a navigation aid for objects that are moving with respect to the arrangement.

In accordance with one embodiment of the invention, the first transmitting unit is designed to determine the relative position data of the first transmitting unit with respect to the three remaining transmitting units on the basis of a propagation time measurement of the first transmission signal and of the first response signals.

The system for calibrating the first transmitting unit according to an embodiment of the invention can comprise one or more iteration steps. By way of example, after the first calibration of the first transmitting unit, a transmission signal can once again be emitted to the three remaining transmitting units, whereupon response signals are returned by the three remaining transmitting units. If a deviation is once again ascertained, a calibration of the transmission parameter of the first transmitting unit occurs again. This procedure is repeated until either the deviation falls below a predetermined deviation limit value or the deviation is completely eliminated.

That is to say that the distance between the first transmitting unit and each of the three remaining transmitting units can be calculated for example from a propagation time measurement of the first transmission signal and/or of the respective response signal, which ultimately results in the relative position of the first transmitting unit within the overall arrangement. A distance between the transmitting units can thus be calculated from the propagation time measurements, taking into account the known propagation velocities of the signals.

In accordance with a further embodiment of the invention, a second transmitting unit of the at least four transmitting units is designed to emit a second transmission signal to the first transmitting unit. The first transmitting unit is designed to receive the second transmission signal and, after receiving the second transmission signal, to return a second response signal to the second transmitting unit. In this case, the second transmitting unit is designed to check the calibration of the transmission parameter of the first transmitting unit on the basis of the second response signal.

In other words, a check as to whether the transmission parameter of the first transmitting unit has been calibrated correctly can take place by means of the second transmitting unit. The check can be accomplished by the second transmitting unit carrying out the propagation time measurement on the basis of the second transmission signal and/or the second response signal and comparing the result of said propagation time measurement with an expected value of the propagation time. The system according to an embodiment of the invention therefore also includes the check of the correctness or quality of the calibration. During the check, the second transmitting unit just like previously the first transmitting unit can carry out a propagation time measurement and then verify the correctness of the calibration of the first transmitting unit on the basis of a comparison of the propagation time determined with the expected value of the propagation time of the signals between first and second transmitting units.

In accordance with a further embodiment of the invention, the second transmitting unit has stored position data with respect to a position of the second transmitting unit. The calibration of the transmission parameter of the first transmitting unit is effected on the basis of a comparison of the propagation time of the second transmission signal and of the second response signal with the stored position data with respect to the position of the second transmitting unit.

In this way it is possible, after a calibration of the transmission parameter of the first transmitting unit has been carried out on the basis of the propagation time measurement from first transmission signal and first response signals, also to carry out a calibration of the transmission parameter of the first transmitting unit on the basis of a propagation time measurement from second transmission signal and second response signal and also the stored position data of the second transmitting unit. The redundancy of the system is thus improved. That also means that the deviation ascertained can be reduced upon each comparison.

Furthermore, with the information about the stored position of the second transmitting unit it is possible to predefine an expected value for the propagation time of the second transmission signal to the first transmitting unit and of the second response signal back to the second transmitting unit, since the position of the second transmission signal is known after all. By way of example, the expected value for the propagation times between the second transmitting unit and the first transmitting unit is based on the assumption that the exact position of the second transmitting unit is known by virtue of the stored position data with respect to the position of the second transmitting unit, and that the first transmitting unit is situated at its setpoint position (hypothetical propagation time for calibrated first transmitting unit). If a transmission signal is then emitted from the second to the first transmitting unit and a response signal is returned from the first to a second transmitting unit, the actual relative position of the first with respect to the second transmitting unit can be determined from the propagation time (actual propagation time for not fully calibrated first transmitting unit). A renewed calibration can then be carried out on the basis of the difference or deviation between hypothetical propagation time and actual propagation time. In other words, said renewed calibration is based on a measurement of the deviation, but by the second and not by the first transmitting unit. In this way, a check of the calibration or of the quality of the calibration of the first transmitting unit can also be made available by the second transmitting unit.

In accordance with a further embodiment of the invention, the first transmission signal and the second transmission signal are in each case radar signals.

In accordance with a further embodiment of the invention, the first response signal and the second response signal are in each case radar signals.

The transmission and response signals can be radio-based signals. They can be radio-frequency-based measurement signals, in particular. Radar signals have the advantage over optical signals that they can be used reliably even under adverse weather conditions. Therefore, the system for calibration and thus also the set navigation system provided by the calibration are suitable for use on watercraft or ships.

In accordance with a further embodiment of the invention, the first transmitting unit is designed to ascertain a malfunction of the system if a first response signal of at least one of the three remaining transmitting units fails to appear.

In this case, not enough first response signals are returned to the first transmitting unit, with the consequence that an unambiguous determination of the relative position data of the first transmitting unit with respect to the three remaining transmitting units is not possible. Therefore, a malfunction is ascertained by the first transmitting unit, in particular by the control unit of the first transmitting unit, whereupon a calibration does not take place.

Provision can be made for a calibration of the transmission parameter of the first transmitting unit to take place only if a first response signal was returned to the first transmitting unit by all the remaining transmitting units. Otherwise, that is to say in the case of a fault message, provision can be made for a transmission signal again to be emitted by the first transmitting unit to the three remaining transmitting units. If a response signal of a transmitting unit again fails to appear and a fault message is output again, provision can be made for the procedure described to be repeated again until the first transmitting unit has obtained a response signal from all the remaining transmitting units.

However, it is also possible that a renewed transmission signal is not emitted by the first transmitting unit to the other transmitting units after a fault message has been ascertained by the first transmitting unit, but rather only if a corresponding command has been issued to the first transmitting unit. Such a command can be predefined by the service personnel, for example. The fault message ascertained can be indicated to the service personnel, for example by a fault output in the form of visual, acoustic or haptic signals.

In accordance with a further embodiment of the invention, the first transmission signal and the second transmission signal are in each case beacon signals in the form of radio signals.

In accordance with a further embodiment of the invention, the first response signals and the second response signals are in each case beacon signals in the form of radio signals.

The signals can thus be sea marks used in shipping. The system for calibrating transmitting units is preferably used for transmitting units of watercraft. The beacon signal is for example a radio beacon or a luminous beacon which can be used to determine the relative position and/or orientation of an object relative to the arrangement of transmitting units. Beacon signals can be used already for determining the relative position of the first transmitting unit with respect to the three remaining transmitting units.

In accordance with a further embodiment of the invention, the calibration of the first transmitting unit comprises a setting of a time parameter and/or of a frequency parameter of the first transmitting unit.

That means that a time value or points in time for the emission of a transmission signal by the first transmitting unit is/are set. Additionally or alternatively, a frequency of the first transmission signal emitted by the first transmitting unit can be set. By way of example, the time parameter or the time value and/or the frequency parameter or the frequency value are/is defined. The setting and definition of the time parameter and/or of the frequency parameter can be carried out by the first transmitting unit itself. In other words, the time parameter and/or the frequency parameter are/is corrected taking into account the ascertained deviation between the stored position data and the relative position data determined. The time parameter and/or the frequency parameter is thus compensated for in order to take account of the position errors of the first transmitting unit that lead to the deviation.

In accordance with a further embodiment of the invention, each transmitting unit of the arrangement of at least four transmitting units is designed to receive a radar signal of an object that is moving relative to the arrangement and as a consequence to emit a response signal to the moving object, such that a relative position of the moving object with respect to the arrangement of at least four transmitting units is determinable.

Consequently, provision can be made of a navigation aid for navigating the moving object with respect to the arrangement of transmitting units. The moving object is for example an aircraft, in particular a helicopter or an aeroplane. The arrangement of transmitting units is arranged for example in the region of a landing site for the aircraft, such that navigation information for the aircraft can be provided on the basis of the response signal emitted by the transmitting units of the arrangement to the aircraft. Said navigation information can comprise a relative position and/or orientation of the aircraft in relation to the arrangement of transmitting units.

In accordance with a further embodiment of the invention, the arrangement comprises a total of eight transmitting units, at least six transmitting units of which are arranged substantially in one plane.

All the abovementioned properties of the arrangement of four transmitting units can thus also apply to eight transmitting units, wherein the calibration of the transmission parameter of a transmitting unit is always carried out by means of the system according to an embodiment of the invention. This may become necessary in the case of exchange of a transmitting unit in the context of maintenance work in which a new transmitting unit, here the first transmitting unit, is installed in the arrangement and must then also be calibrated in accordance with its actual position in order that an adapted or set arrangement of transmitting units can be provided for navigation aid. The plane can form a landing area for an aircraft, in particular for a helicopter.

In accordance with a further embodiment of the invention, two transmitting units of the total of eight transmitting units are arranged at a distance from the plane.

That means that the two transmitting units arranged at a distance are not located in the plane. The transmitting units located at a distance lie for example on a connecting line running parallel to the plane.

By means of the transmitting units located outside the plane, the navigation accuracy can be increased further, particularly if the aircraft is situated in the vicinity of the plane and thus in the region of the transmitting units located in the plane. This can be advantageous during take-off and during landing of the object on the plane.

In accordance with one aspect of the invention, a watercraft comprising the above-described system for calibrating a transmitting unit is specified.

The watercraft is for example a ship, in particular a military ship. The watercraft can comprise a helicopter landing pad that is marked or delimited by the transmitting units of the arrangement of transmitting units.

In accordance with a further embodiment of the invention, the arrangement of at least four transmitting units delimits a landing region for an aircraft.

It is thus possible to provide a radio beacon in direct proximity to the landing region for the aircraft, such that safe navigation of the aircraft relative to the watercraft can be achieved even under adverse ambient conditions. If a calibration of a transmitting unit and thus of the arrangement of transmitting units has been carried out by the system, a local, relative navigation can be provided in which the moving object can be navigated with respect to the arrangement of transmitting units.

In accordance with one aspect of the invention, a platform comprising the above-described system is specified. The platform can be a stationary platform or a moving platform. The platform can therefore be for example a transport vehicle, an oil drilling platform, a helicopter landing pad, etc.

Furthermore, the platform can be an aircraft. By way of example, the platform is incorporated into a manned or an unmanned aircraft, such that a navigation of the moving object, which can likewise be a manned or an unmanned aircraft, with respect to the aircraft comprising the platform can be provided. In particular, the platform comprising the system according to an embodiment of the invention can be an aeroplane with respect to which a navigation of manned or unmanned aeroplanes is necessary in order that these escort aeroplanes can accurately position or orientate themselves in relation to the first-mentioned aeroplane. In order to be able to carry out as accurate positioning or orientation, the system according to an embodiment of the invention can carry out beforehand a calibration for all the transmitting units, in particular for transmitting units newly incorporated into the system.

The platform can furthermore be a land vehicle. By way of example, the platform is a military land vehicle. A navigation of objects that are moving with respect to the land vehicle can thus be provided. By way of example, manned or unmanned aircraft can be navigated with respect to the land vehicle.

In accordance with one aspect of the invention, a method for calibrating a transmitting unit is specified. One step of the method involves arranging at least four transmitting units in an installation environment. A further step involves storing position data with respect to a setpoint position of a first transmitting unit of the at least four transmitting units in the first transmitting unit. A further step involves emitting a first transmission signal to each of the three remaining transmitting units. A further step involves receiving the emitted first transmission signal by means of each of the three remaining transmitting units and subsequently returning a first response signal to the first transmitting unit by means of each of the three remaining transmitting units. A further step involves determining relative position data of the first transmitting unit with respect to the three remaining transmitting units on the basis of the first response signals returned. A further step involves detecting a deviation between the stored position data and the relative position data determined and carrying out a calibration of a transmission parameter of the first transmitting unit on the basis of the detected deviation. The individual steps of the method can be carried out in an arbitrary order or in the order specified above.

The precision of the local relative navigation is improved by the automatic calibration upon the start-up of the calibrated arrangement.

The arrangement can comprise transmitting units which are located outside the plane with respect to the so-called primary configuration, for example the two transmitting units that are at a distance from the plane.

The calibration corrects any deviation of a transmitting unit which can result from the ambient conditions to which the transmitting units are exposed. By way of example, the transmitting units are used during marine operations in polar regions, but also under high insolation. This necessitates correction or compensation of the deviation by the calibration of individual transmitting units.

By means of the system for calibrating transmitting units according to an embodiment of the invention, in particular by means of the calibrated arrangement of transmitting units, it is possible to achieve an independent, local navigation with higher precision than by militarily encrypted global satellite navigation systems (GNSS). Furthermore, it is possible to provide a navigation reference to a moving object in real time, without causing delays originating in the conversion of the axis systems from the absolute or global coordinate system to the aircraft coordinate system or to the coordinate system of the landing platform. A high updating rate for the position determination of the moving object with respect to the arrangement of transmitting units which, if appropriate, delimit the landing platform is possible as a result.

DETAILED DESCRIPTION

The illustrations in the figures are schematic and not to scale.

If the same reference signs are used in different figures in the following description of the figures, and they denote identical or similar elements. However, identical or similar elements may also be designated by different reference signs.

Figure 1A:
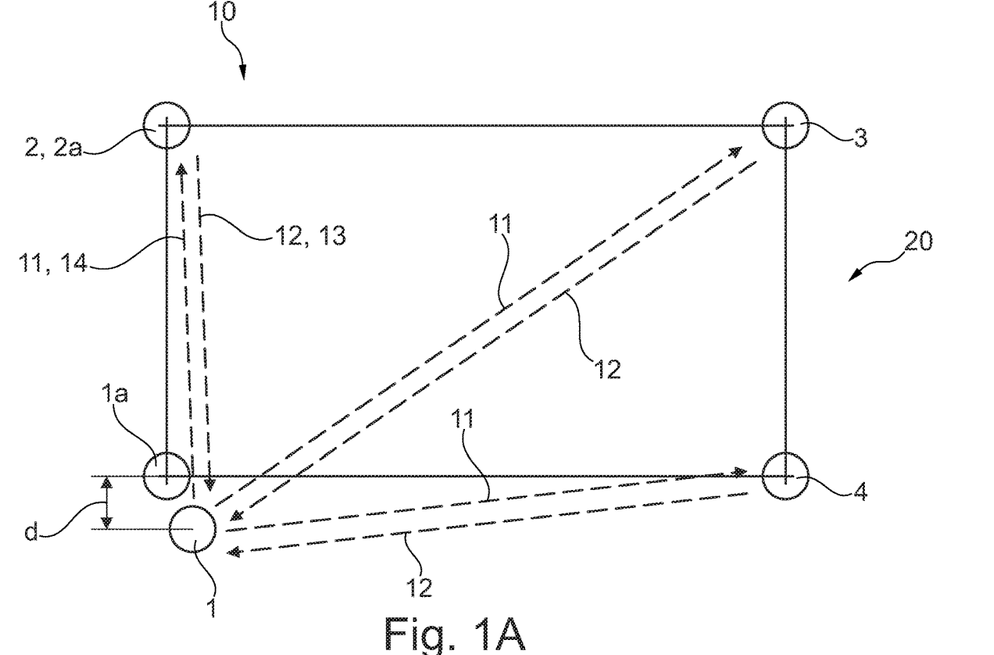
FIG. 1A shows an arrangement of at least four transmitting units in accordance with one exemplary embodiment of the invention.

FIG. 1A shows a system 10 for calibrating a first transmitting unit 1 within an arrangement 20 of transmitting units 1, 2, 3, 4. The arrangement can be arranged on a stationary or moving platform, which is not illustrated in FIG. 1. A first transmitting unit 1 of the at least four transmitting units 1, 2, 3, 4 is designed to emit a first transmission signal 11 to each of the three remaining transmitting units 2, 3, 4. Each of the three remaining transmitting units 2, 3, 4 is designed to receive the first transmission signal 11 and, after receiving the first transmission signal 11, to return a first response signal 12 to the first transmitting unit 1.

Figure 1B:
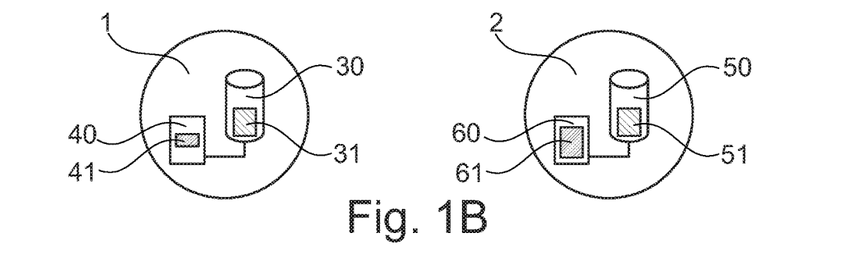
FIG. 1B shows transmitting units each comprising a control unit and a memory unit in accordance with one exemplary embodiment of the invention.

The first transmitting unit 1 is designed to determine relative position data 41 of the first transmitting unit 1 with respect to the three remaining transmitting units 2, 3, 4 on the basis of the first response signals 12 returned, wherein the relative position data 41 are determined by the control unit 40 of the first transmitting unit 1, said control unit being illustrated in FIG. 1B. The relative position data 41 are determined from a propagation time measurement of the first transmission signal 11 from the first transmitting unit 1 to the respective remaining transmitting units 2, 3, 4 and also a propagation time measurement of the first response signals 12 from the remaining transmitting units 2, 3, 4 to the first transmitting unit 1. By way of example, the propagation time of the first transmission signal 11 from the first transmitting unit 1 to the second transmitting unit 2 and the propagation time of the response signal 12 from the second transmitting unit 2 back to the first transmitting unit 1 are measured and added. A distance between the first transmitting unit 1 and the second transmitting unit 2 can thus be calculated from the propagation time measurements, taking into account the known propagation velocities of the signals.

The first transmitting unit 1 furthermore has stored position data 31 with respect to a setpoint position 1a of the first transmitting unit 1. The setpoint position 1a is illustrated in FIG. 1A. FIG. 1B shows that the stored position data 31 with respect to the setpoint position 1a are stored or preprogrammed in a memory unit 30 of the first transmitting unit 1. The relative position data 41 of the first transmitting unit 1 with respect to the three remaining transmitting units 2, 3, 4 are determined by means of the control unit 40 or the processor unit 40 of the first transmitting unit 1.

The first transmitting unit 1, in particular the control unit 40 of the first transmitting unit 1, compares the stored position data 31 with respect to the setpoint position 1a with the relative position data 41 determined. The first transmitting unit 1 or the control unit 40 detects a deviation d between the stored position data 31 and the relative position data 41 determined. On the basis of the detected deviation d, a calibration of a transmission parameter of the first transmitting unit 1 is then carried out by the first transmitting unit 1. The calibration, too, can be carried out by the control unit 40 of the first transmitting unit 1.

FIG. 1B shows the second transmitting unit 2, which comprises a memory unit 50 having stored position data 51 with respect to a position, for example a setpoint position 2a and/or an actual position of the second transmitting unit 2. The second transmitting unit 2 furthermore comprises a control unit 60, which is designed to determine relative position data 61 of the second transmitting unit 2 with respect to the first transmitting unit 1, for example from a propagation time measurement of a second transmission signal 13 emitted by the second transmitting unit 2 and of a second response signal 14 returned by the first transmitting unit 1. The calibration of the transmission parameter of the first transmitting unit 1 can thus be carried out on the basis of a comparison of the propagation time of the second transmission signal 13 and of the second response signal 14 with the stored position data 51 with respect to the position of the second transmitting unit 2.

Figure 2:
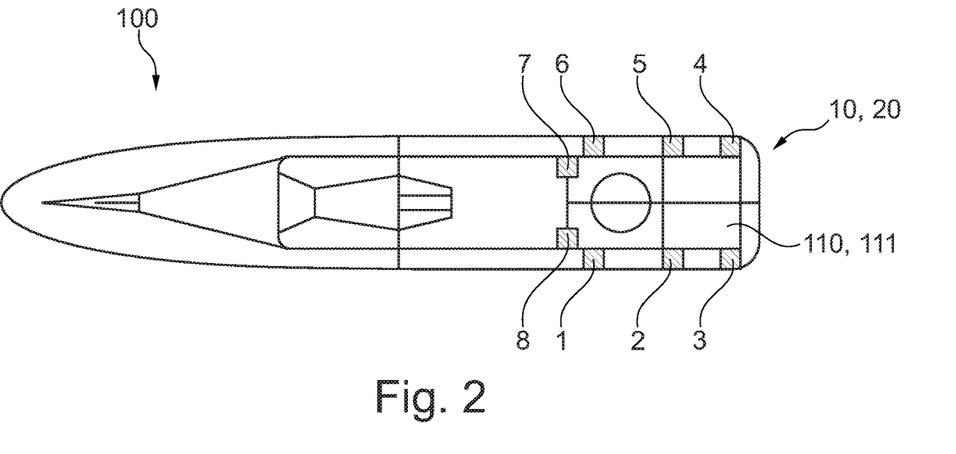
FIG. 2 shows a plan view of a watercraft comprising an arrangement of eight transmitting units in accordance with one exemplary embodiment of the invention.

FIG. 2 shows a watercraft 100 comprising a system 10 for calibrating a transmitting unit 1. The watercraft 100 can be a ship, in particular an aircraft carrier. To that end, the watercraft 100 can comprise a landing area or a landing region 111 for the aircraft, which is not illustrated in FIG. 2. The system 10 comprises an arrangement 20 of eight transmitting units 1, 2, 3, 4, 5, 6, 7, 8, six transmitting units 1, 2, 3, 4, 5, 6 of which are arranged in one plane 110, wherein the plane 110 forms the landing area and the six transmitting units 1, 2, 3, 4, 5, 6 located in the plane 110 delimit the landing region 111 for the aircraft.

Figure 3:
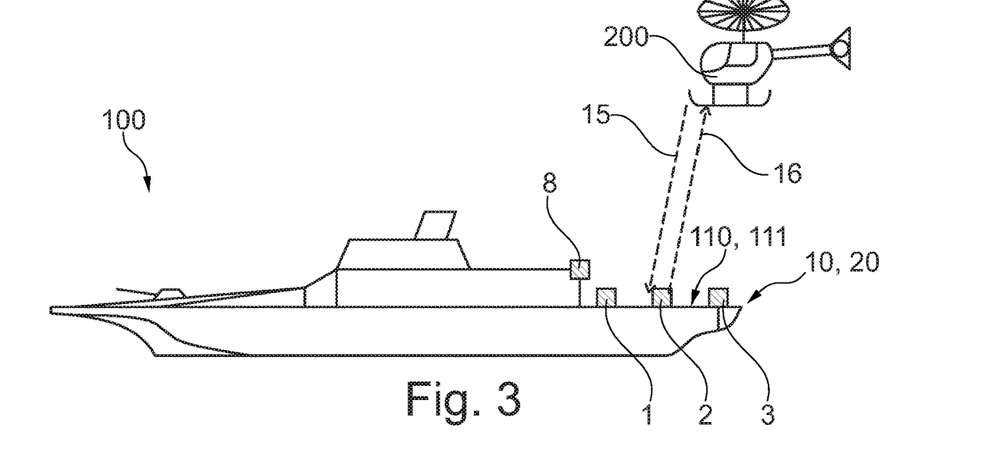
FIG. 3 shows a side view of a watercraft comprising an arrangement of eight transmitting units in accordance with one exemplary embodiment of the invention.

FIG. 3 shows a side view of the watercraft 100 from FIG. 2. FIG. 3 clearly reveals that the transmitting units 7 and 8 are not arranged in the plane 110, but rather are at a distance therefrom. In contrast thereto, the six transmitting units 1, 2, 3, 4, 5, 6 are located in the plane 110. If the system 10 or the arrangement 20 is ready for use, that is to say that the transmitting units 1, 2, 3, 4, 5, 6, 7, 8 are all set, coordinated with one another and calibrated, all the transmitting units 1, 2, 3, 4, 5, 6, 7, 8 can be used as navigation means for navigating the aircraft 200 by virtue of the fact that transmission signals 15 are emitted by the aircraft to the transmitting units 1, 2, 3, 4, 5, 6, 7, 8, and the transmitting units 1, 2, 3, 4, 5, 6, 7, 8, after receiving the transmission signals 15, each return a response signal 16 to the aircraft 200, and a relative position determination and/or orientation determination for the aircraft 200 with respect to the watercraft 100 and thus the arrangement 20 are/is subsequently determined on the basis of a propagation time measurement of the transmission signals 15 and the response signals 16. Safe landing of the aircraft 200 on the watercraft 100 can thus be ensured. The arrangement 20 of the transmitting units 1, 2, 3, 4, 5, 6, 7, 8 can be arbitrary in this case. FIGS. 2 and 3 show merely an example of such an arrangement 20.

Figure 4:
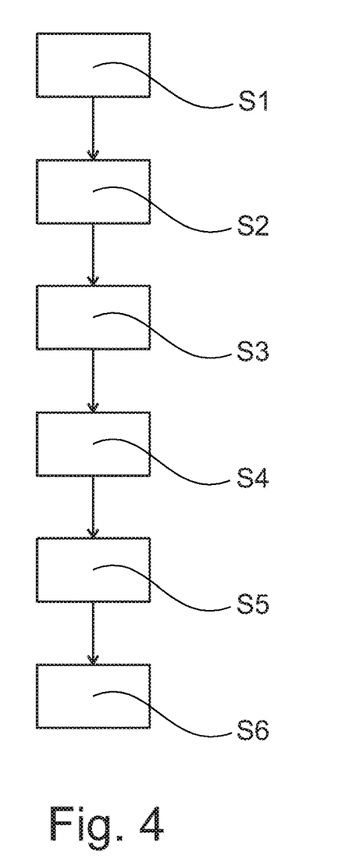
FIG. 4 shows a flow diagram for a method for calibrating a transmitting unit in accordance with one exemplary embodiment of the invention.

FIG. 4 shows a flow diagram for a method for calibrating a transmitting unit 1. One step S1 of the method involves arranging at least four transmitting units 1, 2, 3, 4 in an installation environment. A further step S2 involves storing position data 31 with respect to a setpoint position 1a of a first transmitting unit 1 of the at least four transmitting units 1, 2, 3, 4. A further step S3 involves emitting a first transmission signal 11 to each of the three remaining transmitting units 2, 3, 4. A further step S4 involves receiving the emitted first transmission signal 11 by means of each of the three remaining transmitting units 2, 3, 4 and subsequently returning a first response signal 12 to the first transmitting unit 1 by means of each of the three remaining transmitting units 2, 3, 4. A further step S5 involves determining relative position data 41 of the first transmitting unit 1 with respect to the three remaining transmitting units 2, 3, 4 on the basis of the first response signals 12 returned. Furthermore, a further step S6 involves detecting a deviation d between the stored position data 31 and the relative position data 41 determined and carrying out a calibration of a transmission parameter of the first transmitting unit 1 on the basis of the detection deviation d.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for calibrating a transmitting unit, the system comprising:
   an arrangement of at least four transmitting units,
   wherein a first transmitting unit of the at least four transmitting units has stored position data with respect to a setpoint position of the first transmitting unit,
   wherein the first transmitting unit is configured to emit a first transmission signal to each of the three remaining transmitting units,
   wherein each of the three remaining transmitting units is configured to receive the first transmission signal and, after receiving the first transmission signal, to return a first response signal to the first transmitting unit,
   wherein the first transmitting unit is configured to determine relative position data of the first transmitting unit with respect to the three remaining transmitting units on the basis of the first response signals returned,
   wherein the first transmitting unit is configured to detect a deviation between the stored position data and the relative position data determined and to carry out a calibration of a transmission parameter of the first transmitting unit on the basis of the detected deviation, and
   wherein a second transmitting unit of the at least four transmitting units is configured to emit a second transmission signal to the first transmitting unit,
   wherein the first transmitting unit is configured to receive the second transmission signal and, after receiving the second transmission signal, to return a second response signal to the second transmitting unit, and wherein the second transmitting unit is configured to check the calibration of the transmission parameter of the first transmitting unit on the basis of the second response signal.

2. The system according to claim 1, wherein the first transmitting unit is configured to determine the relative position data of the first transmitting unit with respect to the three remaining transmitting units on the basis of a propagation time measurement of the first transmission signal and of the first response signals.

3. The system according to claim 1,
wherein the second transmitting unit has stored position data with respect to a position of the second transmitting unit, and
wherein the calibration of the transmission parameter of the first transmitting unit is effected on the basis of a comparison of the propagation time of the second transmission signal and of the second response signal with the stored position data with respect to the position of the second transmitting unit.

4. The system according to claim 3,
wherein the first transmission signal and the second transmission signal are in each case radar signals, and/or
wherein the first response signal and the second response signal are in each case radar signals.

5. The system according to claim 1,
wherein the first transmission signal and the second transmission signal are in each case radar signals, and/or
wherein the first response signal and the second response signal are in each case radar signals.

6. The system according to claim 1,
wherein the first transmission signal and the second transmission signal are in each case beacon signals in the form of radio signals, and
wherein the first response signals and the second response signals are in each beacon signals in the form of radio signals.

7. The system according to claim 1, wherein the calibration of the first transmitting unit comprises a setting of a time parameter and/or of a frequency parameter of the first transmitting unit.

8. A system for calibrating a transmitting unit, the system comprising:
an arrangement of at least four transmitting units,
wherein a first transmitting unit of the at least four transmitting units has stored position data with respect to a setpoint position of the first transmitting unit,
wherein the first transmitting unit is configured to emit a first transmission signal to each of the three remaining transmitting units,
wherein each of the three remaining transmitting units is configured to receive the first transmission signal and, after receiving the first transmission signal, to return a first response signal to the first transmitting unit,
wherein the first transmitting unit is configured to determine relative position data of the first transmitting unit with respect to the three remaining transmitting units on the basis of the first response signals returned,
wherein the first transmitting unit is configured to detect a deviation between the stored position data and the relative position data determined and to carry out a calibration of a transmission parameter of the first transmitting unit on the basis of the detected deviation, and wherein the first transmitting unit is configured to ascertain a malfunction of the system if a first response signal of at least one of the three remaining transmitting units fails to appear.

9. A system for calibrating a transmitting unit, the system comprising:
an arrangement of at least four transmitting units,
wherein a first transmitting unit of the at least four transmitting units has stored position data with respect to a setpoint position of the first transmitting unit,
wherein the first transmitting unit is configured to emit a first transmission signal to each of the three remaining transmitting units,
wherein each of the three remaining transmitting units is configured to receive the first transmission signal and, after receiving the first transmission signal, to return a first response signal to the first transmitting unit,
wherein the first transmitting unit is configured to determine relative position data of the first transmitting unit with respect to the three remaining transmitting units on the basis of the first response signals returned,
wherein the first transmitting unit is configured to detect a deviation between the stored position data and the relative position data determined and to carry out a calibration of a transmission parameter of the first transmitting unit on the basis of the detected deviation, and
wherein each transmitting unit of the arrangement of at least four transmitting units is configured to receive a radar signal of an object that is moving relative to the arrangement and as a consequence to emit a response signal to the moving object, such that a relative position of the moving object with respect to the arrangement of at least four transmitting units is determinable.

10. A system for calibrating a transmitting unit, the system comprising:
an arrangement of at least four transmitting units,
wherein a first transmitting unit of the at least four transmitting units has stored position data with respect to a setpoint position of the first transmitting unit,
wherein the first transmitting unit is configured to emit a first transmission signal to each of the three remaining transmitting units,
wherein each of the three remaining transmitting units is configured to receive the first transmission signal and, after receiving the first transmission signal, to return a first response signal to the first transmitting unit,
wherein the first transmitting unit is configured to determine relative position data of the first transmitting unit with respect to the three remaining transmitting units on the basis of the first response signals returned,
wherein the first transmitting unit is configured to detect a deviation between the stored position data and the relative position data determined and to carry out a calibration of a transmission parameter of the first transmitting unit on the basis of the detected deviation, and
wherein the arrangement comprises a total of eight transmitting units, at least six transmitting units of which are arranged substantially in one plane.

11. The system according to claim 10, wherein two transmitting units of the total of eight transmitting units are arranged at a distance from the plane.

12. A watercraft comprising a system for calibrating a transmitting unit, the system comprising:
an arrangement of at least four transmitting units, wherein a first transmitting unit of the at least four transmitting units has stored position data with respect to a setpoint position of the first transmitting unit, wherein the first transmitting unit is configured to emit a first transmission signal to each of the three remaining transmitting units, wherein each of the three remaining transmitting units is configured to receive the first transmission signal and, after receiving the first transmission signal, to return a first response signal to the first transmitting unit, wherein the first transmitting unit is configured to determine relative position data of the first transmitting unit with respect to the three remaining transmitting units on the basis of the first response signals returned, wherein the first transmitting unit is configured to detect a deviation between the stored position data and the relative position data determined and to carry out a calibration of a transmission parameter of the first transmitting unit on the basis of the detected deviation, and wherein the arrangement of at least four transmitting units delimits a landing region for an aircraft.

13. A method for calibrating a transmitting unit, the method comprising:

arranging at least four transmitting units in an installation environment;

storing position data with respect to a setpoint position of a first transmitting unit of the at least four transmitting units;

emitting a first transmission signal to each of the three remaining transmitting units;

receiving the emitted first transmission signal by each of the three remaining transmitting units and subsequently returning a first response signal to the first transmitting unit by each of the three remaining transmitting units;

determining relative position data of the first transmitting unit with respect to the three remaining transmitting units on the basis of the first response signals returned;

detecting a deviation between the stored position data and the relative position data determined and carrying out a calibration of a transmission parameter of the first transmitting unit on the basis of the detected deviation; and ascertaining a malfunction of the system by the first transmitting unit if a first response signal of at least one of the three remaining transmitting units fails to appear.

* * * * *